United States Patent [19]
Boehringer

[11] Patent Number: 5,456,523
[45] Date of Patent: Oct. 10, 1995

[54] MULTI-WHEEL BRAKE SYSTEM

[75] Inventor: Wilfred E. Boehringer, Fullerton, Calif.

[73] Assignee: McDonnell Douglas Corporation, St. Louis, Mo.

[21] Appl. No.: 183,677

[22] Filed: Jan. 19, 1994

[51] Int. Cl.⁶ .................................................. B60T 8/32
[52] U.S. Cl. .................. 303/13; 188/152; 188/106 P; 188/151 A; 303/6.01; 303/14; 303/113.1; 303/84.1
[58] Field of Search ................. 303/14–18, 93, 303/13, 113.5, 113.1, 119.1, 117.1, 50–56, 7; 188/152, 106 P, 16, 151 A, 354; 244/111, 110 H, 226, 110 A; 91/33, 32, 446, 528, 530, 6, 28, 468, 523, 522, 524; 60/582, 405, 428, 430

[56] References Cited

U.S. PATENT DOCUMENTS

| | | |
|---|---|---|
| 2,494,461 | 1/1950 | Trevaskis . |
| 3,357,310 | 12/1967 | Rohde . |
| 3,588,191 | 6/1971 | Atkin . |
| 3,774,974 | 11/1973 | Braun . |
| 3,920,282 | 11/1975 | DeVlieg .............................. 244/111 X |
| 4,071,284 | 1/1978 | Masclet et al. . |
| 4,142,445 | 3/1979 | Lohbauer . |
| 4,704,865 | 11/1987 | Archung . |
| 4,711,089 | 12/1987 | Archung . |
| 4,770,470 | 9/1988 | Tarumizu et al. ..................... 303/13 X |
| 4,792,192 | 12/1988 | Tveitane . |

Primary Examiner—Douglas C. Butler
Attorney, Agent, or Firm—Blakely, Sokoloff, Taylor & Zafman

[57] ABSTRACT

A braking system which employs redundant hydraulic systems. The system has a first hydraulic system coupled to the brake of a first wheel through a first switching valve, and a second hydraulic system coupled to the brake of a second wheel through a second switching valve. Each switching valve will switch the coupled brake to the other hydraulic system, if the pressure within its system falls below a threshold value. For example, if the first hydraulic system fails, the first switching valve switches the first wheel to the second hydraulic system. If the second hydraulic system fails, the second switching valve switches the second wheel to the first hydraulic system.

18 Claims, 5 Drawing Sheets

MULTI-WHEEL BRAKE SYSTEM

BACKGROUND OF THE INVENTION

1. Field of the Invention

The present invention relates to a brake system for an aircraft.

2. Description of Related Art

Large commercial aircraft typically have two four wheel trucks one located under each wing of the airplane. Each wheel on the truck is braked through a power brake system that is controlled by a foot pedal in the cockpit of the aircraft. Braking system for commercial aircraft typically utilize two independent, or a standby back-up configuration to obtain the redundancy necessary to meet aircraft safety requirements.

FIG. 1 shows a conventional prior art braking system for commercial aircraft commonly referred to as a dual cavity system. The dual cavity system is supplied by a first hydraulic system 12 and an independent second hydraulic system 14. Each wheel 16 is connected to a pair of anti-skid valves 18 that are powered from a dual brake valve 20 of a corresponding hydraulic system. The left hand valves of both systems 12 and 14 brake valves 20, are coupled to the wheels 16L (1–4) under the left wing of the aircraft. Likewise, the right hand valves of both systems 12 and 14 brake valves, are coupled to the wheels 16R (5–8) under the right wing of the plane.

Each wheel brake has two isolated sets of actuating cylinders. If one of the hydraulic systems pressure is lost, the set of cylinders associated with that system will become disabled. The pilot can still brake the wheels of the depressurized system through the other system. For example, if the first system 12 become depressurized, the pilot can still brake the wheels through the second hydraulic system 14 and the set of cylinders in fluid communication with the second hydraulic system 14.

Conventional dual cavity braking systems also contain hydraulic fuses and manual by-pass valves 22 for each anti-skid valve 18 of the system. For an aircraft with two four wheel trucks, the brake system requires 2 dual brake valves, 16 anti-skid valves, 16 fuses, 16 by-pass valves, 8 dual cavity brakes and 16 hoses. Dual cavity braking systems thus require a large number of components that increase the expense and weight of the aircraft.

FIG. 2 shows a prior art braking system commonly referred to as a single cavity system. In a single cavity system, each wheel 30 has only one set of brake actuating cylinders. The cylinders are pressurized by a brake valve 32 through the anti-skid valves 34, fuse/by-pass valves 36 and shuttle valves 38 of a primary hydraulic system 40. The shuttle valves 38 are also coupled to the alternate brake valve 42 of an emergency back-up hydraulic system 44 through anti-skid valves 46. The primary hydraulic system 40 has a single anti-skid valve 34 for each wheel. The back-up system 44 has an anti-skid valve 46 for each pair of wheels. If the primary hydraulic system 40 fails, the shuttle valve(s) 38 switch the wheels over to the emergency back-up system 44.

Although the single cavity system reduces the number of components from the dual cavity system, the single system still requires 12 different anti-skid valves and the fuses/by-pass valves associated with each valve. It would be desirable to have a braking system with a redundant hydraulic system which contains a smaller number of components than the dual and single cavity systems of the prior art.

SUMMARY OF THE INVENTION

The present invention is a braking system which employs redundant hydraulic systems. The system has a first hydraulic system coupled to the brake of a first wheel through a first switching valve, and a second hydraulic system coupled to the brake of a second wheel through a second switching valve. Each switching valve will switch the coupled brake to the other hydraulic system, if the pressure within its system falls below a threshold value. For example, if the first hydraulic system fails, the first switching valve switches the first wheel to the second hydraulic system. If the second hydraulic system fails, the second switching valve switches the second wheel to the first hydraulic system.

The braking system is preferably used on a commercial aircraft which has at least two four wheel trucks (8 wheels). The braking system has only one anti-skid valve corresponding to each wheel of the aircraft. For a two truck, four wheel configuration, the braking system of the present invention requires only 8 anti-skid valves and associated fuses, etc., for the entire aircraft, a significant reduction from the 12 or 16 anti-skid valves needed in conventional aircraft.

It is therefore an object of the present invention to provide a braking system for an aircraft which has redundant hydraulic systems and requires less components than aircraft braking systems of the prior art.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
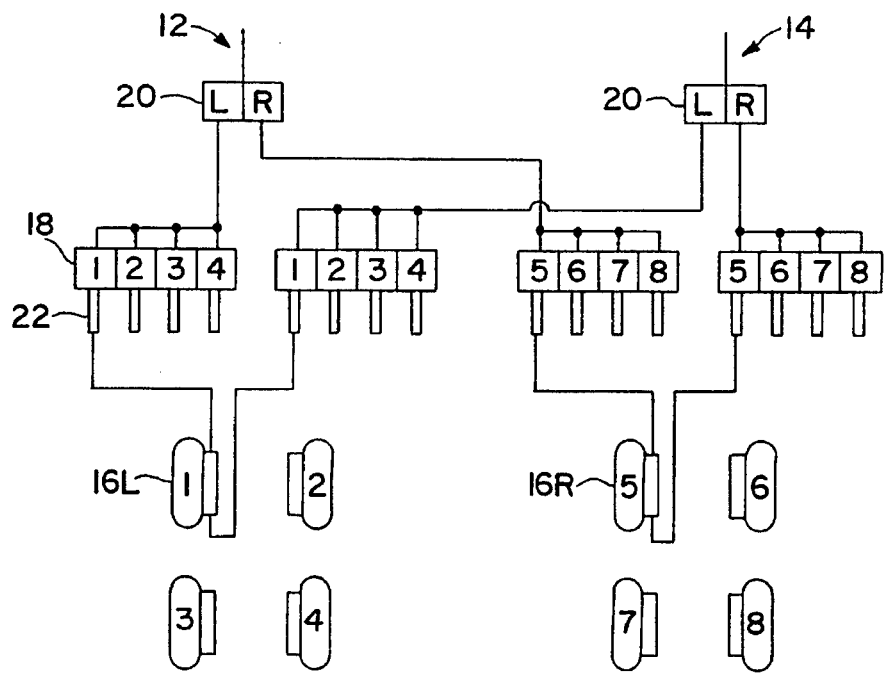
FIG. 1 is a schematic of a dual cavity braking system of the prior art.
Figure 2:
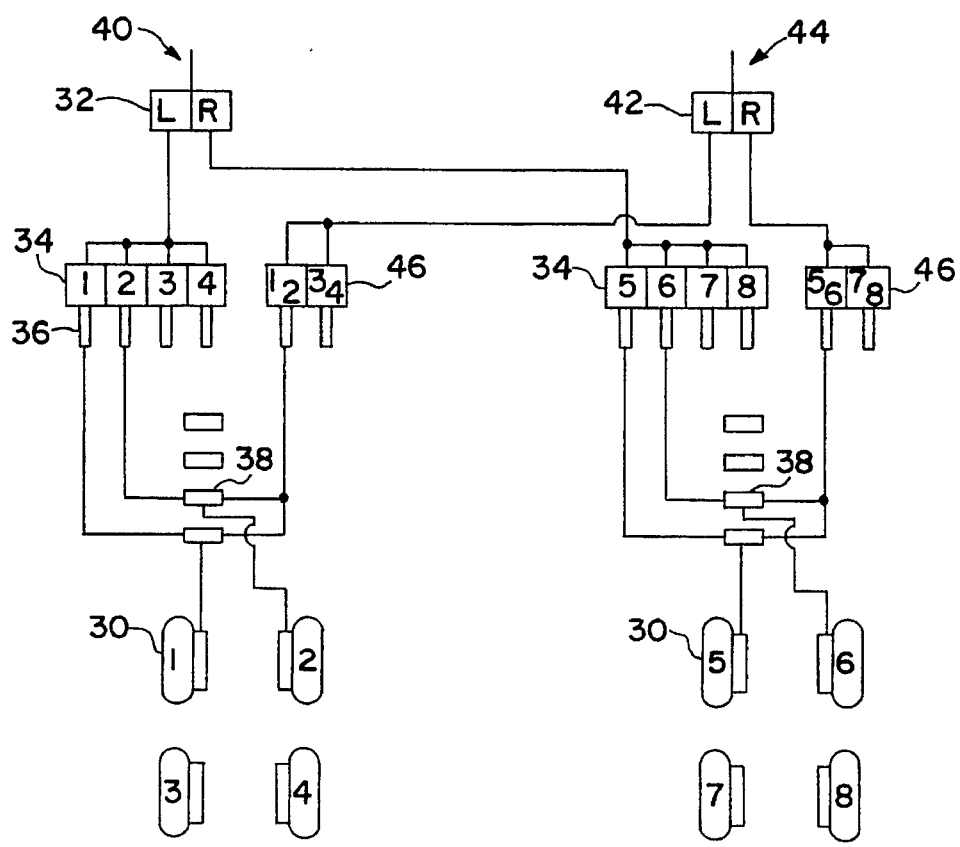
FIG. 2 is a schematic of a single cavity braking system of the prior art.
Figure 3:
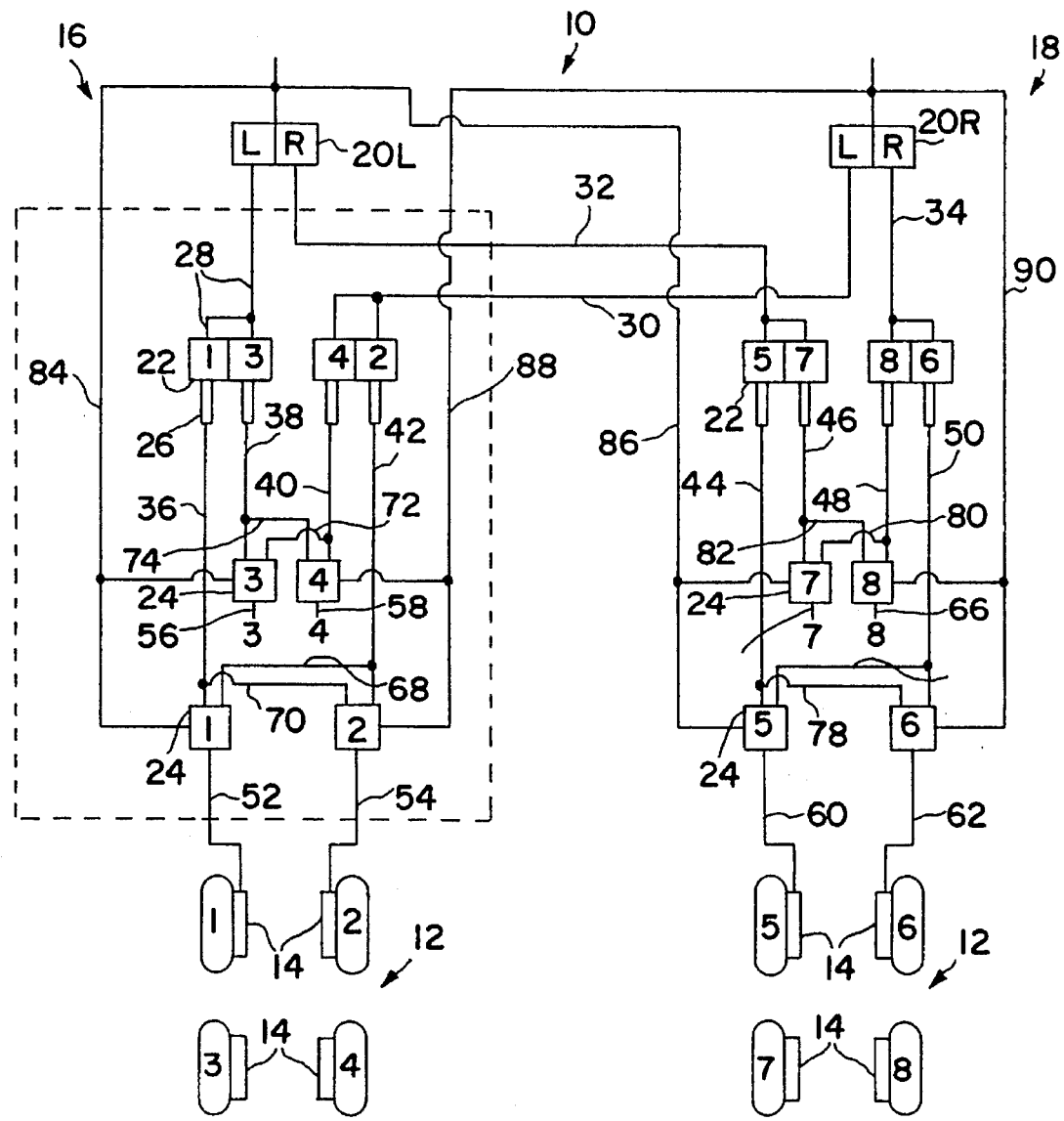
FIG. 3 is a schematic of a braking system of the present invention.

Referring to the drawings more particularly by reference numbers, FIG. 3 shows a braking system 10 of the present invention. The braking system 10 is typically used on commercial aircraft. Although a system 10 used on a commercial aircraft is described and shown, it is to be understood that the braking system 10 of the present invention can be used on any vehicle where braking is required.

The system 10 is typically used on an aircraft with at least two trucks each having four wheels 12. One truck contains wheels 1–4, while the other truck contains wheels 5–8. Each wheel 12 has a brake 14. The brakes 14 are preferably single cavity, wherein all actuating cylinders (not shown) in a single brake are connected to the same hose.

The system 10 has a first hydraulic system 16 and an independent second hydraulic system 18. Each hydraulic system 16 and 18 has a dual brake valve 20 coupled to corresponding pressure sources. Each dual brake valve 20 has a left valve L and a right valve R. The left valves L of both brake valves 20 are coupled to the wheels 1–4. The right valves R of both brake valves 20 are coupled to the wheels 5–8. The left valves 20L are connected to a foot pedal (not shown) in the cockpit of the aircraft, which can actuate the valves 20L to brake the wheels 1–4 when the peddle is depressed. Likewise, the right valves 20R are connected to a separate foot peddle which can actuate the valves 20R to brake the wheels 5–8.

The wheels 12 are coupled to the dual brake valves 20 through anti-skid valves 22 and switching valves 24. Each wheel 1–8 has an associated anti-skid valve 1–8 and a switching valve 1–8. Each wheel/brake is controlled by an anti-skid system that modulates pressure with the anti-skid valve 22 to maintain peak deceleration characteristics. Coupled to each anti-skid valve 22 is a hydraulic fuse/by-pass valve 26. The hydraulic fuse measures the volume of fluid that flows into the corresponding brake and closes the line if the fluid volume exceeds a predetermined value. An excessive volume of fluid is indicative of a failure or excessive leak downstream from the fuse. The by-pass valve allows an operator to reset the fuse or bleed the brakes.

The anti-skid valves 1 and 3 are connected to the left side of the dual brake valve 20L of the first hydraulic system 16 by hydraulic lines 28. The anti-skid valves 2 and 4 are connected to the left side of the dual brake valve 20R of the second hydraulic system 18 by lines 30. The anti-skid valves 5 and 7, and 6 and 8 are coupled to the right side of the brake valves 20L and 20R of the first and second hydraulic systems, by lines 32 and 34, respectively. The anti-skid valve 1 is connected to the switching valve 1 by line 36. Anti-skid valves 2–8 are connected to switching valves 2–8 by lines 38–50, respectively. The switching valves 1–8 are connected to corresponding brakes of the wheels 1–8 by lines 52–66.

Switching valve 1 is connected to line 42 of anti-skid valve 2 by line 68. Switching valve 2 is connected to line 36 of anti-skid valve 1 by line hydraulic 70. Likewise, switching valve 3 is connected to line 40 by line 72, valve 4 is connected to line 38 by line 74, valve 5 is connected to line 50 by line 76, valve 6 is connected to line 44 by line 78, valve 7 is connected to line 48 by line 80 and valve 8 is connected to line 46 by line 82. Switching valves 1, 3, 5 and 7 are also coupled to the pressure line of the first hydraulic system 16 through lines 84 and 86, respectively. Switching valves 2, 4, 6 and 8 are coupled to the inlet port of the dual brake valve 20 in the second hydraulic system 18 through lines 88 and 90, respectively.

Each switching valve 24 has a pressure sensing element coupled to the corresponding hydraulic system, which senses when the fluid pressure within the hydraulic system falls below a predetermined threshold value and switches the corresponding brake to the operating hydraulic system, accordingly. The pressure sensing element of switching valves 1 and 3 are coupled to hydraulic pressure line 84, valves 2 and 4 are coupled to pressure line 88, valves 5 and 7 are coupled to pressure line 86 and valves 6 and 8 are coupled to pressure line 88. By way of example, if the pressure within the first system 16 falls below the threshold value, the switching valves 1, 3, 5 and 7 will couple the wheels 1, 3, 5 and 7 to the second hydraulic system 18 through lines 68, 72, 76 and 80, respectively. Likewise, if the pressure within the second system 18 drops below the threshold value, the switching valves 2, 4, 6 and 8 will couple the wheels 2, 4, 6 and 8 to the first hydraulic system 16 through lines 70, 74, 78 and 82. The switching valves 24 thus allow the brakes to operate even though one of the hydraulic systems has failed.

Figure 4:
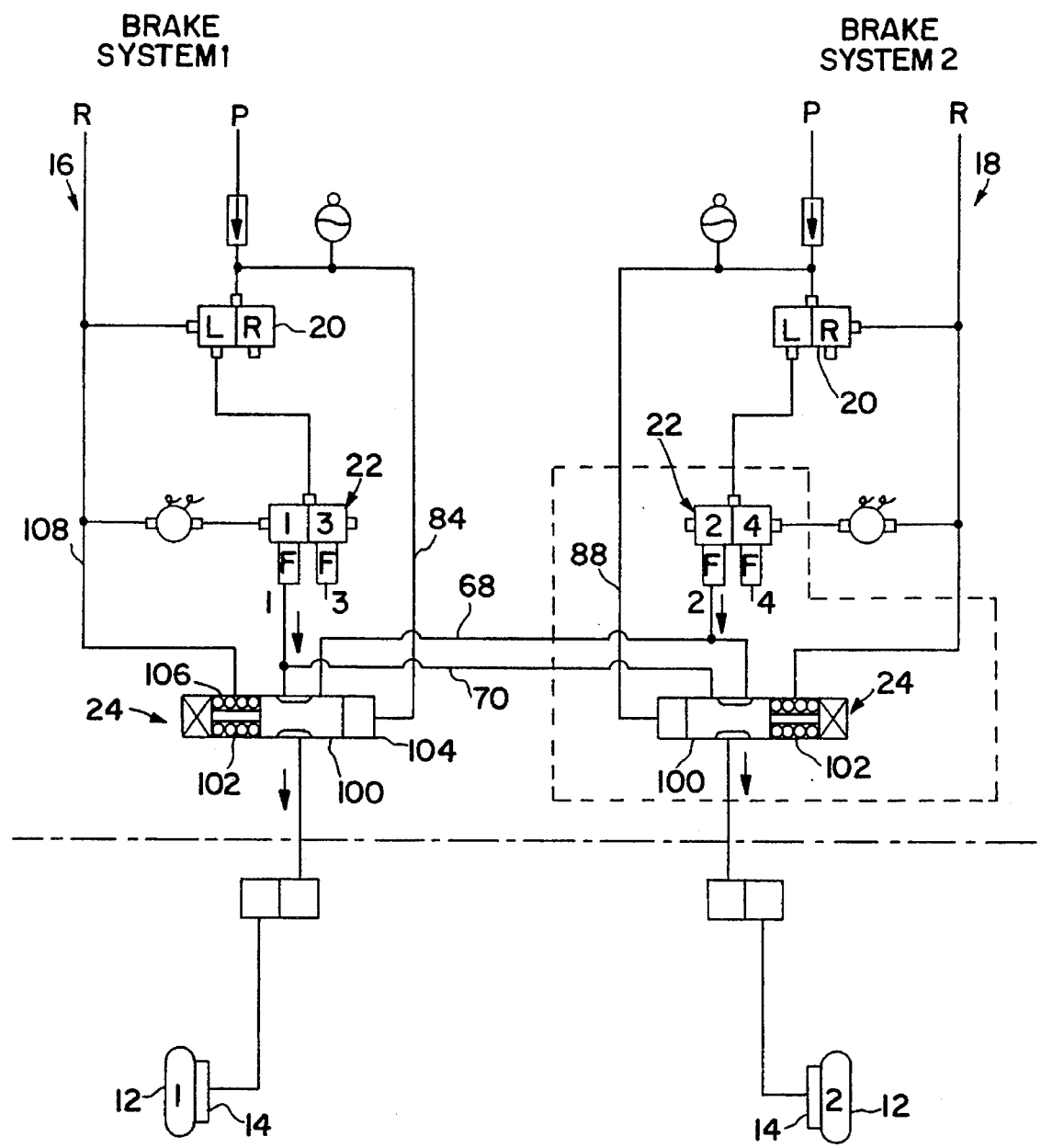
FIG. 4 is a schematic of a specific embodiment of the braking system of FIG. 3.

FIG. 4 shows an embodiment of the switching valves 24 coupled to wheels 1 and 2 and anti-skid valves 1 and 2. Each valve has a spool 100 which can move between a first position and a second position. When the spool 100 of the switching valve 1 is in the first position, the valve 24 allows fluid communication between the wheel 1 and the anti-skid valve 1 of the first hydraulic system 16. When the spool 100 valve 1 of the switching valve 1 is in the second position, the valve 24 provides fluid communication between the wheel 1 and the anti-skid valve 2 of the second hydraulic system 18.

The pressure sensing element of each switching valve 24 comprises a spring 102 which biases the spool 100 toward the second position and a sensor chamber 104 which is in fluid communication with the hydraulic pressure lines 84 and 88. The springs 102 are located within a spring chamber 106 that is coupled to a return line 108 that allows fluid to flow back into the system. When the pressure within the hydraulic system is above the threshold value, the fluid pressure within the chamber 104 counteracts the force of the spring 102 and maintains the spool 100 in the first position, such that the wheel is coupled to the anti-skid valve of the hydraulic system.

Figure 5:
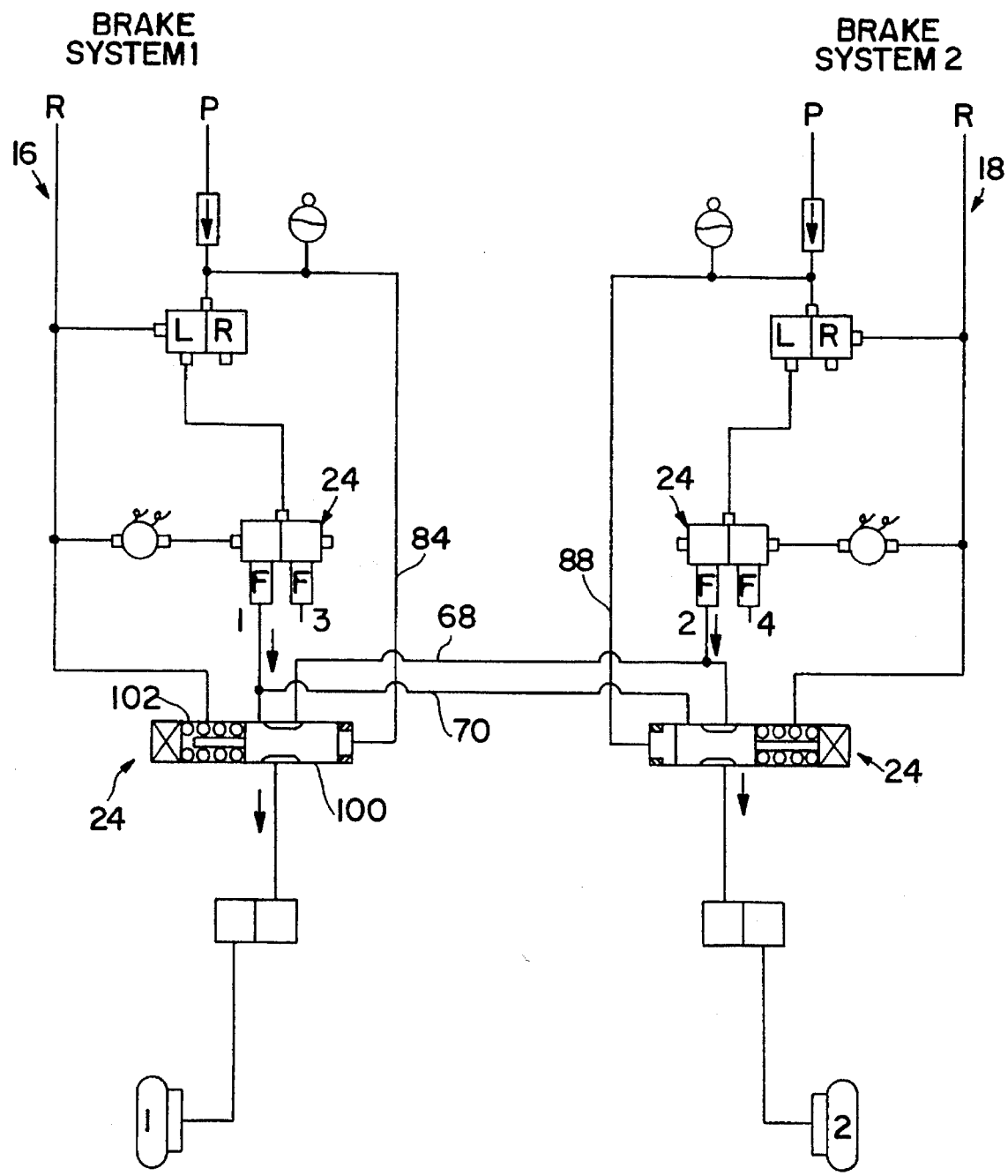
FIG. 5 is a schematic similar to FIG. 4, showing the braking system when one of the hydraulic lines fails.

As shown in FIG. 5, when the pressure within the first hydraulic system 16 drops below the threshold value, the spring 102 of switching valve 24 in brake system 1 moves the spool 100 to the second position so that the wheel 1 is in fluid communication with the second hydraulic system 18 through line 68. Alternatively, if the pressure within the second hydraulic system 18 drops below the threshold value, the spring 102 of switching valve 2 will move the spool 100 into the second position so that the wheel 2 is in fluid communication with the first hydraulic system 16 through line 70.

Figure 6:
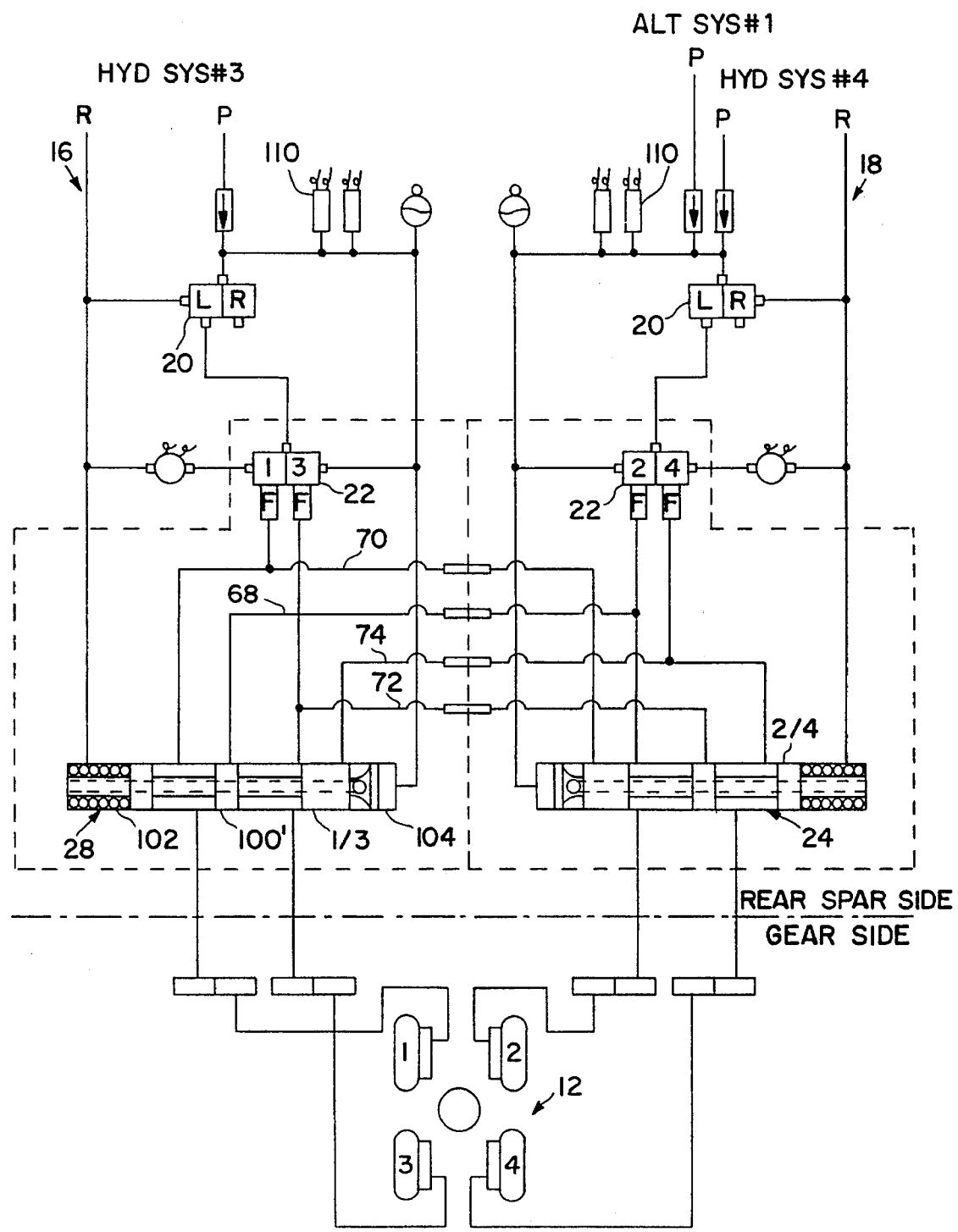
FIG. 6 is a schematic of an alternate embodiment of the braking system.

FIG. 6 shows a preferred embodiment, wherein the switching valves 1 and 3 shown in FIG. 4 are combined into a single switching valve 1/3 and the switching valves 2 and 4 are combined into a single switching valve 2/4. Each switching valve has a spring 102, chamber 104 and a dual ported spool 100' that can couple two wheels to the alternate hydraulic system. When the switching valves 24 switch the wheels to the alternate hydraulic system, each wheel becomes coupled to another wheel through a common anti-skid valve 22. For example, if the first hydraulic system 16 fails, the switching valve 1/3 couples the wheels 1 and 3 to the anti-skid valves 2 and 4, respectively, such that wheel 1 is coupled to wheel 2, and wheel 3 is coupled to wheel 4. The system may have pressure switches 110 which sense a drop of pressure in a system and then direct the anti-skid feedback signal from the wheels in the failed system 16 to the anti-skid valves of the alternate system and operate in a pair wheel mode. For example, the anti-skid signal from wheel 1 is normally directed to the anti-skid valve 1. If the first hydraulic system were to fail, the switching valve 24 would couple both wheel 1 and wheel 2 to the anti-skid valve 2. The pressure switch 110 would sense the drop in system pressure and re-route the anti-skid signal from wheel 1 to the anti-skid valve 2. The system may require a back-up pressure switch 110 for each hydraulic system 16 and 18 to provide redundancy in the system.

For an aircraft with 8 wheels, the braking system of the present invention requires 2 dual brake valves, 8 anti-skid valves, 8 fuses, 8 by-pass valves, 4 (embodiment of FIG. 6)

or 8 (embodiment of FIG. 3) switching valves, 8 single cavity brakes, 8 hoses to the brakes and 8 hydraulic lines to the struts of the wheel trucks. The present invention provides a redundant braking system that requires less components than systems of the prior art. Less components reduce the complexity, cost and weight of the system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A brake system, comprising:

a first source of pressurized fluid having a first fluid pressure;

a first anti-skid valve coupled to said first pressurized fluid source;

a second source of pressurized fluid having a second fluid pressure;

a second anti-skid valve coupled to said second pressurized fluid source;

a first wheel;

a second wheel;

a first brake coupled to said first wheel;

a second brake coupled to said second wheel;

a first switching valve that provides fluid communication between said first anti-skid valve and said first brake when said first fluid pressure is at least a predetermined first valve threshold pressure and provides fluid communication between said first brake and said second anti-skid valve when said first fluid pressure is less than said first valve threshold pressure such that said second anti-skid valve is coupled to both said first brake and said second brake; and, a second switching valve that provides fluid communication between said second anti-skid valve and said second brake when said second fluid pressure is at least a predetermined second valve threshold pressure and provides fluid communication between said second brake and said first anti-skid valve when said second fluid pressure is less than said second valve threshold pressure such that said first anti-skid valve is coupled to both said first brake and said second brake.

2. The brake system as recited in claim 1, further comprising;

a third wheel;

a fourth wheel;

a third brake coupled to said third wheel;

a fourth brake coupled to said fourth wheel;

a third switching valve that provides fluid communication between said first pressurized fluid source and said third brake when said first fluid pressure is at least said predetermined first valve threshold pressure and provides fluid communication between said third brake and said second pressurized fluid source when said first fluid pressure is less than said first valve threshold pressure; and, a fourth switching valve that provides fluid communication between said second pressurized fluid source and said fourth brake when said second fluid pressure is at least said predetermined second valve threshold pressure and provides fluid communication between said fourth brake and said first pressurized fluid source when said second fluid pressure is less than said second valve threshold pressure.

3. The brake system as recited in claim 2, further comprising a first anti-skid valve which varies a fluid pressure to said first brake in response to a speed of said first wheel, a second anti-skid valve which varies a fluid pressure to said second brake in response to a speed of said second wheel, a third anti-skid valve which varies a fluid pressure to said third brake in response to a speed of said third wheel, and a fourth anti-skid valve which varies a fluid pressure to said fourth brake in response to a speed of said fourth wheel.

4. The brake system as recited in claim 3, further comprising hydraulic fuses coupled to said first, second, third and fourth anti-skid valves.

5. The brake system as recited in claim 1, further comprising hydraulic fuses coupled to said first and second anti-skid valves.

6. The brake system as recited in claim 1, further comprising a sensor switch which couples said first wheel and said second wheel to said first anti-skid valve when said second fluid pressure is less than said second threshold valve pressure, and couples said first wheel and said second wheel to said second anti-skid valve when said first fluid pressure is less than said first valve threshold pressure.

7. The brake system as recited in claim 1, wherein said first and second switching valves each have a spool that moves between a first position and a second position, wherein one of said pressurized fluid sources is in fluid communication with a corresponding brake when said spool is in said first position and said brake is in fluid communication with the other pressurized fluid source when said spool is in said second position.

8. The brake system as recited in claim 7, wherein said switching valves each have biasing means for pushing a first end of said spool, and a sensor chamber that provides fluid communication between said pressurized fluid source and a second opposite end of said spool, wherein said spring pushes said spool from said first position to said second position when fluid pressure within said sensor chamber is below said valve threshold pressure.

9. The brake system as recited in claim 1, wherein said first switching valve also provides fluid communication between said first pressurized fluid source and a third brake coupled to a third wheel when said first fluid pressure is at least said predetermined first valve threshold pressure and provides fluid communication between said third brake and said second pressurized fluid source when said first fluid pressure is less than said first valve threshold pressure, and said second switching valve provides fluid communication between said second pressurized fluid source and a fourth brake coupled to a fourth wheel when said second fluid pressure is at least said predetermined second valve threshold pressure and provides fluid communication between said fourth brake and said first pressurized fluid source when said second fluid pressure is less than said second valve threshold pressure.

10. A brake system, comprising:

a first source of pressurized fluid having a first fluid pressure;

a first anti-skid valve coupled to said first pressurized fluid source;

a second source of pressurized fluid having a second fluid pressure;

a second anti-skid valve coupled to said second pressurized fluid source;

a first wheel;

a second wheel;

a first brake coupled to said first wheel;

a second brake coupled to said second wheel;

first switching valve means for providing fluid communication between said first anti-skid valve and said first brake when said first fluid pressure is at least a predetermined first valve threshold pressure and providing fluid communication between said first brake and said second anti-skid valve when said first fluid pressure is less than said first valve threshold pressure such that said second anti-skid valve is coupled to both said first brake and said second brake; and, second switching valve means for providing fluid communication between said second anti-skid valve and said second brake when said second fluid pressure is at least a predetermined second valve threshold pressure and providing fluid communication between said second brake and said first anti-skid valve when said second fluid pressure is less than said second valve threshold pressure such that said first anti-skid valve is coupled to both said first brake and said second brake.

11. The brake system as recited in claim 10, further comprising;

a third wheel;

a fourth wheel;

a third brake coupled to said third wheel;

a fourth brake coupled to said fourth wheel;

third switching valve means for providing fluid communication between said first pressurized fluid source and said third brake when said first fluid pressure is at least said predetermined first valve threshold pressure and providing fluid communication between said third brake and said second pressurized fluid source when said first fluid pressure is less than said first valve threshold pressure; and, fourth switching valve means for providing fluid communication between said second pressurized fluid source and said fourth brake when said second fluid pressure is at least said predetermined second valve threshold pressure and providing fluid communication between said fourth brake and said first pressurized fluid source when said second fluid pressure is less than said second valve threshold pressure.

12. The brake system as recited in claim 11, further comprising first anti-skid valve means for varying a fluid pressure to said first brake in response to a speed of said first wheel, second anti-skid valve means for varying a fluid pressure to said second brake in response to a speed of said second wheel, third anti-skid valve means for varying a fluid pressure to said third brake in response to a speed of said third wheel, and fourth anti-skid valve means for varying a fluid pressure to said fourth brake in response to a speed of said fourth wheel.

13. The brake system as recited in claim 12, further comprising hydraulic fuses coupled to said first, second, third and fourth anti-skid valve means.

14. The brake system as recited in claim 10, further comprising hydraulic fuses coupled to said first and second anti-skid valve means.

15. The brake system as recited in claim 10, further comprising sensor switch means for coupling said first wheel and said second wheel to said first anti-skid valve means when said second fluid pressure is less than said second valve threshold pressure and coupling said first wheel and said second wheel to said second anti-skid valve means when said first fluid pressure is less than said first valve threshold pressure.

16. The brake system as recited in claim 10, wherein said first and second switching valve means each have a spool that moves between a first position and a second position, wherein one of said pressurized fluid sources is in fluid communication with a corresponding brake when said spool is in said first position and said brake is in fluid communication with the other pressurized fluid source when said spool is in said second position.

17. The brake system as recited in claim 16, wherein said switching valve means each have biasing means for pushing a first end of said spool, and a sensor chamber that provides fluid communication between said pressurized fluid source and a second opposite end of said spool, wherein said spring pushes said spool from said first position to said second position when fluid pressure within said sensor chamber is below valve said threshold pressure.

18. The brake system as recited in claim 10, wherein said first switching valve means also provides fluid communication between said first pressurized fluid source and a third brake coupled to a third wheel when said first fluid pressure is at least said predetermined first valve threshold pressure and provides fluid communication between said third brake and said second pressurized fluid source when said first fluid pressure is less than said first valve threshold pressure, and said second switching valve means provides fluid communication between said second pressurized fluid source and a fourth brake coupled to a fourth wheel when said second fluid pressure is at least said predetermined second valve threshold pressure and provides fluid communication between said fourth brake and said first pressurized fluid source when said second fluid pressure is less than said second valve threshold pressure.

* * * * *